(12) United States Patent
Hsu et al.

(10) Patent No.: US 11,846,795 B2
(45) Date of Patent: Dec. 19, 2023

(54) BACKLIGHT MODULE

(71) Applicant: InnoLux Corporation, Miao-Li County (TW)

(72) Inventors: Wei-Tsung Hsu, Miao-Li County (TW); Chun-Fang Chen, Miao-Li County (TW); Wei-Ning Shih, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/097,751

(22) Filed: Jan. 17, 2023

(65) Prior Publication Data

US 2023/0258855 A1    Aug. 17, 2023

(30) Foreign Application Priority Data

Feb. 17, 2022   (CN) .......................... 202210146371.5

(51) Int. Cl.
*F21V 8/00*    (2006.01)
(52) U.S. Cl.
CPC ......... *G02B 6/0031* (2013.01); *G02B 6/0036* (2013.01); *G02B 6/0073* (2013.01)
(58) Field of Classification Search
CPC ... G02B 6/0031; G02B 6/0036; G02B 6/0073
See application file for complete search history.

(56) References Cited

FOREIGN PATENT DOCUMENTS

| CN | 101206280 | A |   | 6/2008  |           |
|----|-----------|---|---|---------|-----------|
| CN | 101329472 | A | * | 12/2008 |           |
| CN | 100595478 | C |   | 3/2010  |           |
| CN | 203277490 | U |   | 11/2013 |           |
| CN | 106870966 | A |   | 6/2017  |           |
| CN | 107505769 | A | * | 12/2017 | G02B 6/0003 |
| CN | 111208670 | A | * | 5/2020  | G02B 6/0021 |
| CN | 115185125 | A | * | 10/2022 |           |
| TW |   525309  | B |   | 3/2003  |           |
| TW |  M264517  | U |   | 5/2005  |           |
| TW | 201308681 | A |   | 2/2013  |           |
| TW | 202202777 | A |   | 1/2022  |           |

* cited by examiner

*Primary Examiner* — Mary Ellen Bowman
(74) *Attorney, Agent, or Firm* — Muncy, Geissler, Olds & Lowe (57) ABSTRACT

A backlight module includes a substrate, a plurality of light emitting elements, a light guide device and a plurality of reflective elements. The light emitting elements are arranged on the substrate. The light guide device includes a plurality of light guide portions arranged to respectively correspond to the light emitting elements, wherein each of the light guide portions is provided with a first through hole, and the first through holes of the light guide portions respectively expose the light emitting elements. The reflective elements are respectively arranged on the light emitting elements, wherein, in a normal direction of the substrate, the reflective elements respectively overlap with the first through holes of the light guide portions.

19 Claims, 7 Drawing Sheets

BACKLIGHT MODULE

CROSS REFERENCE TO RELATED APPLICATION

This application claims the benefits of the Chinese Patent Application Serial Number 202210146371.5, filed on Feb. 17, 2022, the subject matter of which is incorporated herein by reference.

BACKGROUND

1. Field of the Disclosure

The present disclosure relates to a backlight module and, more particularly, to a backlight module with a light guide device.

2. Description of Related Art

Currently, the contrast or quality requirements for electronic (display) devices in the market are constantly increased. However, the backlight modules of current electronic (display) devices still have display taste problems such as halo and poor light output efficiency. Therefore, there is a need to provide an improved backlight module to mitigate and/or obviate the problems of halo phenomenon and poor light output efficiency.

SUMMARY

The present disclosure provides a backlight module, which comprises: a substrate; a plurality of light emitting elements disposed on the substrate; a light guide device including a plurality of light guide portions arranged respectively corresponding to the plurality of light emitting elements, wherein each of the light guide portions is provided with a first through hole, and the first through holes of the light guide portions respectively expose the plurality of light emitting elements; and a plurality of reflective elements respectively disposed on the light emitting elements, wherein, in a normal direction of the substrate, the reflective elements respectively overlap with the first through holes of the light guide portions.

Other novel features of the disclosure will become more apparent from the following detailed description when taken in conjunction with the accompanying drawings.

DETAILED DESCRIPTION OF EMBODIMENT

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "containing" and "comprising" are open-ended words, and should be interpreted as meaning "including but not limited to . . . ".

Directional terms mentioned in the specification, such as "up", "down", "front", "rear", "left", "right", etc., only refer to the directions of the drawings. Accordingly, the directional term used is illustrative, not limiting, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or a non-physical structure, which is not limited. In the present disclosure, when a certain structure is arranged "on" other structures, it may mean that a certain structure is "directly" on other structures, or it means that a certain structure is "indirectly" on other structures; that is, at least one structure is sandwiched, in between a certain structure and other structures.

The terms, such as "about", "equal to", "equal" or "same", "substantially", or "substantially", are generally interpreted as within 20% of a given value or range, or as within 10%, 5%, 3%, 2%, 1%, or 0.5% of a given value or range.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

In the present disclosure, the measurements of thickness, length, width and angle may be obtained by using an optical microscope, and the thickness or angle may be obtained by measuring a cross-sectional image in an electron microscope, but it is not limit thereto. In addition, any two values or directions used for comparison may have certain errors. Additionally, references in the presents disclosure to the terms, such as "equal to", "equal", "same", "substantially," or "approximately", generally mean within 10% of a given value or range. Furthermore, the terms "a given range is from a first value to a second value", "a given range is within a range from the first value to the second value" means that the given range includes the first value, the second value and other values therebetween. If the first direction is perpendicular to the second direction, the angle between the first direction and the second direction may be between 80 and 100 degrees; if the first direction is parallel to the second direction, the angle between the first direction and the second direction may be between 0 and 10 degrees.

It is noted that the following are exemplary embodiments of the present disclosure, but the present disclosure is not limited thereto, while a feature of some embodiments can be applied to other embodiments through suitable modification, substitution, combination, or separation. In addition, the present disclosure can be combined with other known structures to form further embodiments.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiment of the present disclosure.

Figure 1:
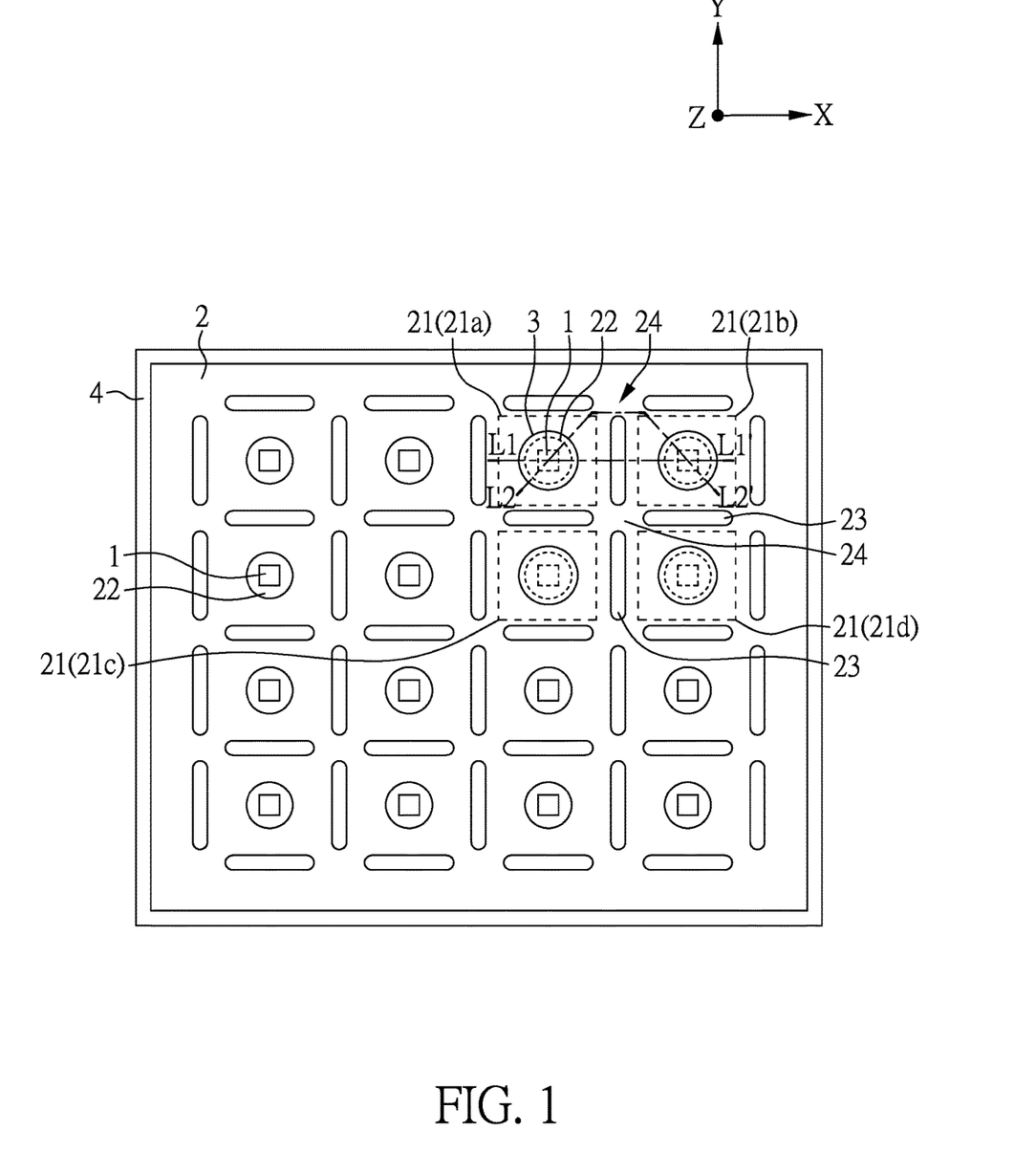
FIG. 1 is a schematic diagram illustrating part of the backlight module according to an embodiment of the present disclosure.

FIG. 1 is a schematic diagram illustrating part of the backlight module according to an embodiment of the present disclosure, in which, for the convenience of description, part of the reflective elements 3 is omitted in FIG. 1.

Figure 2:
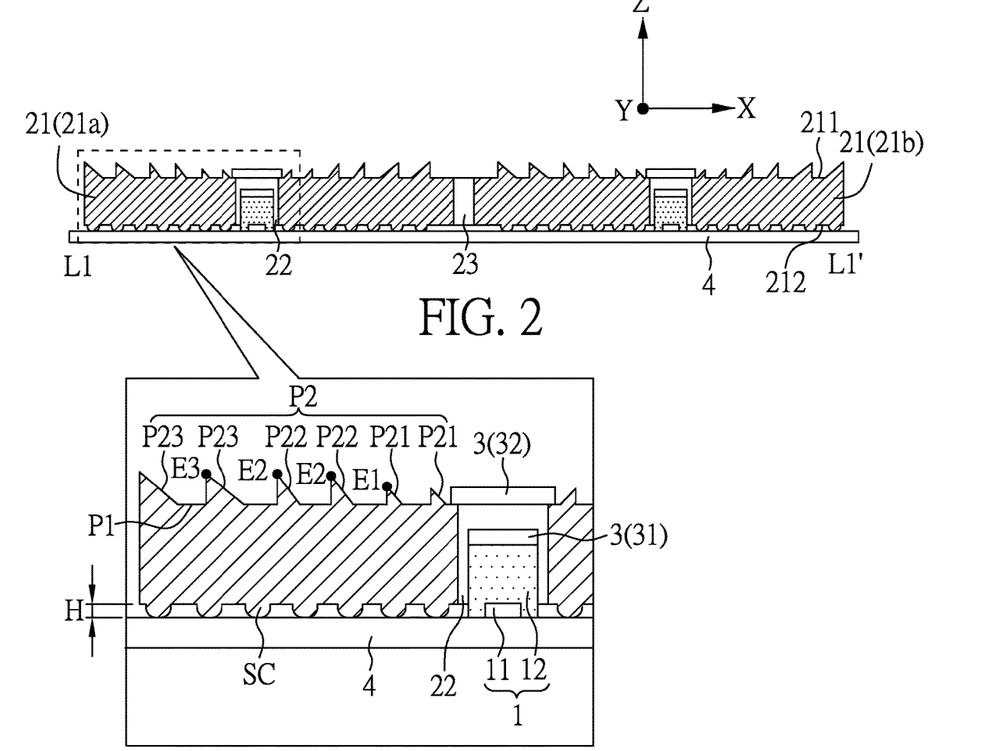
FIG. 2 is a schematic cross-sectional view taken along line L1-L1' of FIG. 1.

As shown in FIG. 1, the backlight module of the present disclosure may include: a substrate 4; a plurality of light emitting elements 1 arranged on the substrate 4; a light guide device 2 including a plurality of light guide portions 21 arranged to correspond to the light emitting elements 1, respectively, wherein each of the light guide portions 21 is provided with a first through hole 22, and the first through holes 22 of the light guide portions 21 respectively expose the light emitting elements 1; and a plurality of reflective elements 3 (for example, the first reflective element 31 and/or the second reflective element 32 shown in FIG. 2) respectively arranged on the light emitting elements 1, wherein, in the normal direction Z of the substrate 4, the reflective elements 3 overlap with the first through holes 22 of the light guide portions 21, respectively. With the arrangement of the light guide device 2, The backlight module of the present disclosure may obtain a relatively uniform collimated light source, thereby increasing the light output efficiency of the backlight module or improving the halo phenomenon.

As shown in FIG. 1, the plurality of light guide portions 21 may include a first light guide portion 21a, a second light guide portion 21b, a third light guide portion 21c and a fourth light guide portion 21d, and the first light guide portion 21a, the second light guide portion 21b, the third light guide portion 21c and the fourth light guide portion 21d may be arranged in a 2×2 matrix, but it is not limited thereto. In other embodiments, the plurality of light guide portions 21 may be arranged in an M×N matrix, but it is not limited thereto. The plurality of light emitting elements 1 respectively overlap with the first through holes 22 of the plurality of light guide portions 21 corresponding thereto, so that the lights of the plurality of light emitting elements 1 respectively pass through the corresponding light guide portions 21 for being guided out.

In the present disclosure, the material of the light guide device 2 may include polymethyl methacrylate (PMMA), polycarbonate (PC), cyclo olefin polymer (COP), other suitable materials or a combination thereof, but it is not limited thereto.

Figure 3:
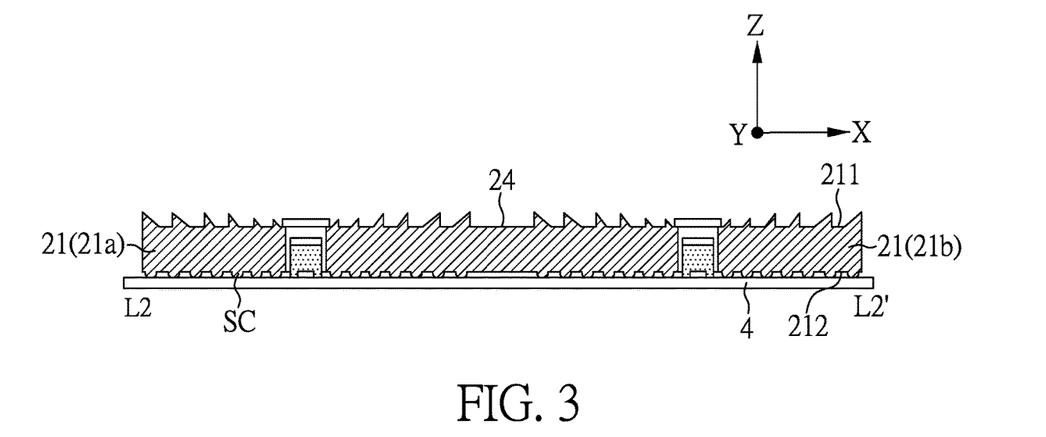
FIG. 3 is a schematic cross-sectional view taken along line L2-L2' of FIG. 1.

FIG. 2 is a schematic cross-sectional view taken along line L1-L1' of FIG. 1, and FIG. 3 is a schematic cross-sectional view taken along line L2-L2' of FIG. 1.

As shown in FIG. 2 and FIG. 3, each of the reflective elements 3 may include a first reflective element 31 and a second reflective element 32, wherein the first reflective elements 31 of the plurality of reflective elements 3 may be respectively disposed in the first through holes 22 of the plurality of light guide portions 21. More specifically, in the normal direction Z of the substrate 4, the area of the first reflective element 31 is, for example, smaller than the area of the first through hole 22. In addition, the first reflective element 31 may be arranged on the light emitting element 1 and may be in contact with the light emitting element 1 to guide the light source emitted by the light emitting element 1 to the light guide portion 21, but it is not limited thereto. In some embodiments, the second reflective elements 32 of the plurality of reflective elements 3 may be respectively arranged on the plurality of light guide portions 21. More specifically, in the normal direction Z of the substrate 4, the area of the second reflective element 32 is, for example, larger than the area of the first through hole 22. In other words, the second reflective element 32 may cover the first through hole 22 to guide the light source emitted by the light emitting element 1 to the light guide portion 21, thereby reducing the chance of generating point light sources and improving the light output effect of the light guide device 2. In some embodiments, the second reflective element 32 may contact part of the light guide portion 21. In this embodiment, the first reflective element 31 and the second reflective element 32 are simultaneously provided, but it is not limited thereto. In other implementation aspects, only one of the first reflective element 31 or the second reflective element 32 may be provided.

In the present disclosure, the first reflective element 31 may include a colloidal material and a reflective material, but it is not limited thereto. Specific examples of the colloidal material may include, but are not limited to, epoxy resin, phenolic resin, rubber, silicone, polyurethane, polyacrylate, other suitable materials, or a combination thereof. The reflective material may include a pigment, for example, a white pigment or other suitable materials. For example, the reflective material may include, but is not limited to, titanium dioxide, aluminum oxide, zinc oxide, zirconium oxide, other suitable materials, or a mixture thereof, but it is not limited there to. In the present disclosure, the first reflective element 31 may be formed on the light emitting element 1 by a coating method (e.g., spin coating, glue dispensing, etc.) or a lamination process, but it is not limited thereto. In some embodiments, the first reflective element 31 may include 20% by weight to 40% by weight of reflective material, but it is not limited thereto. In one embodiment, the first reflective element 31 may include 25% by weight to 35% by weight of reflective material, but it is not limited thereto. In some embodiments, the material of the second reflective element 32 may include metal (e.g., silver, aluminum), plastic material (e.g., polyimide, polyethylene terephthalate), other suitable materials, or a combination thereof, but it is not limited thereto.

As shown in FIG. 1 and FIG. 2, the light guide device 2 is provided with a second through hole 23, and the second through hole 23 is disposed between two adjacent ones of the plurality of light guide portions 21. As shown in FIG. 1, the second through hole 23 may be disposed between the first light guide portion 21a and the second light guide portion 21b, between the first light guide portion 21a and the third light guide portion 21c, between the second light guide portion 21b and the fourth light guide portion 21d, or between the third light guide portion 21c and the fourth light guide portion 21d. The second through hole 23 may provide a light blocking effect to improve the light interference of the adjacent light emitting elements 1, but it is not limited thereto.

As shown in FIG. 1 and FIG. 3, the light guide device 2 further has a connecting portion 24, and two adjacent ones of the plurality of light guide portions 21 may be connected through the connecting portion 24. More specifically, as shown in FIG. 1, the first light guide portion 21a may be adjacent to the second light guide portion 21b and the third light guide portion 21c, respectively, and is connected thereto through the connecting portions 24, respectively. Similarly, the fourth light guide portion 21d is adjacent to the second light guide portion 21b and the third light guide portion 21c, respectively, and is connected thereto through the connecting portions 24, respectively. Generally, the brightness of the four corners of the light emitting element 1 is relatively low, which may cause defects in taste, while the connecting portion 24 may be used to increase the light output of the four corners of the light guide portion 21 so as to improve the light output efficiency or enhance the taste effect.

In some embodiments, as shown in FIGS. 2 and 3, the light emitting element 1 may include a chip 11 and an encapsulation layer 12 arranged on the chip 11, and the encapsulation layer 12 may encapsulate the chip 11. In the present disclosure, the light emitting element 1 may include a light emitting diode, such as an organic light emitting diode or an inorganic light emitting diode, a sub-millimeter light emitting diode (mini LED), a micro light emitting diode (micro LED), a quantum dot light emitting diode (quantum dot LED), but it is not limited thereto. In some embodiments, the encapsulation layer 12 may include phosphors or quantum dots, but it is not limited thereto. In the present disclosure, the material of the encapsulation layer 12 may include a transparent material, which may be used to protect the chip 11 and internal circuits (not shown), etc., without affecting the light emitted by the phosphors or quantum dots. In some embodiments, the material of the encapsulation layer 12 may include suitable materials such as epoxy, silicone, acrylic, polymethyl methacrylate, or a combination thereof, but it is not limited thereto.

In the present disclosure, as shown in FIG. 2 and FIG. 3, each of the plurality of light guide portions 21 is provided with a light output surface 211 and a bottom surface 212, wherein the bottom surface 212 and the light output surface 211 are disposed opposite to each other, and the plurality of light emitting elements 1 are respectively arranged to be adjacent to the bottom surfaces 212 and away from the light output surfaces 211. In some embodiments, the light output surface 211 includes a plurality of flat portions P1 and a plurality of protruding portions P2, and the plurality of flat portions P1 and the plurality of protruding portions P2 are alternately arranged and connected to each other. In some embodiments, each of the plurality of light emitting elements 1 may guide light from the light output surface 211 through the corresponding light guide portion 21. In some embodiments, the light output surfaces 211 of the plurality of light guide portions 21 are respectively away from the corresponding light emitting elements 1.

In the present disclosure, the "protruding portion P2" refers to a portion of the light output surface 211 that protrudes in a direction away from the bottom surface 212, and may also refer to a portion of the light output surface 211 that protrudes in a direction away from the corresponding light emitting element 1. As shown in FIGS. 2 and 3, the plurality of protruding portions P2 include, for example, a first protruding portion P21, a second protruding portion P22, and a third protruding portion P23, and the second protruding portion P22 is arranged between the first protruding portion P21 and the third protruding portion P23, wherein the first protruding part P21 is adjacent to the corresponding light emitting element 1 compared to the second protruding portion P22 and the third protruding portion P23. In some embodiments, the numbers of the first protruding portions P21, the second protruding portions P22 and the third protruding portions P23 are not particularly limited. For example, in this embodiment, there are two first protruding portions P21, two second protruding portions P22 and two third protruding portions P23 for illustration, but it is not limited thereto. In other implementation aspects, the numbers of the first protruding portions P21, the second protruding portions P22 and the third protruding portions P23 may be adjusted as required.

Figure 4:
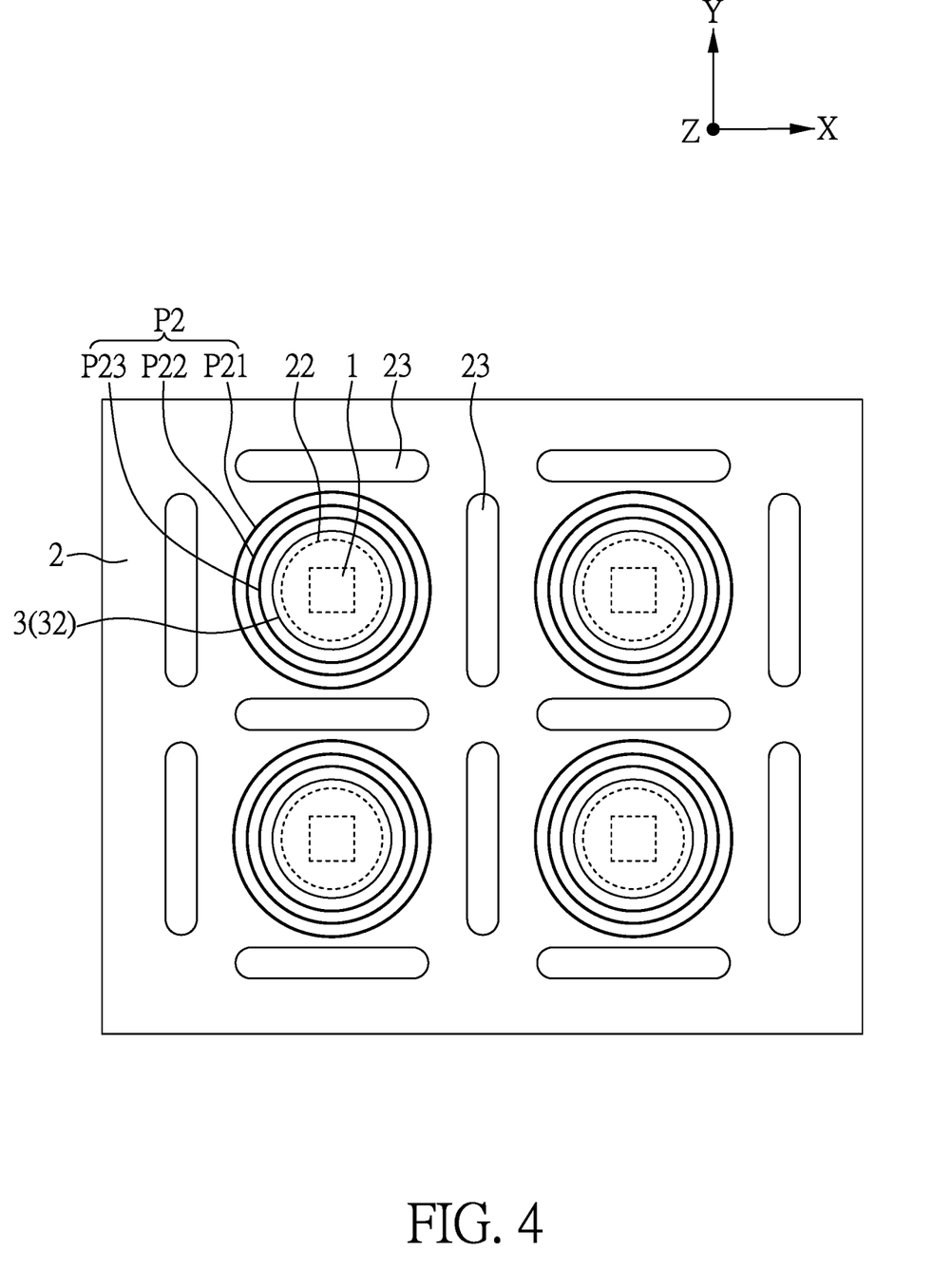
FIG. 4 is a schematic diagram illustrating part of the light guide device according to an embodiment of the present disclosure.

FIG. 4 is a schematic diagram illustrating part of the light guide device according to an embodiment of the present disclosure.

As shown in FIG. 4, the plurality of protruding portions P2 of the light emitting surfaces 211 of the light guide portion 21 respectively surround the corresponding light emitting element 1 among the plurality of light emitting elements. More specifically, the plurality of protruding portions P2 may surround the corresponding light emitting element 1 in concentric circles or other suitable patterns, so as to uniformly guide out the light of the light emitting element 1 thereby improving the taste effect, but it is not limited thereto. In the normal direction Z of the substrate 4, the plurality of protruding portions P2 may have circular, elliptical or other suitable shapes. In this embodiment (FIG. 4), there are one first protruding portion P21, one second protruding portion P22 and one third protruding portion P23 taken as an example, but it is not limited thereto. In other implementation aspects, the numbers of the first protruding portions P21, the second protruding portions P22 and the third protruding portions P23 may be adjusted as required.

In some embodiments, the pitches between two adjacent ones of the first protruding portion P21, the second protruding portion P22 and the third protruding portion P23 may be approximately equal, for example, the pitch between the first protruding portion P21 and the second protruding portion P22 may be between 110 μm and 115 μm (110 μm≤pitch≤115 μm) or between 112 μm and 114 μm (112

μm≤pitch≤114 μm), but it is not limited thereto. Similarly, the pitch between the second protruding portion P22 and the third protruding portion P23 may be between 110 μm and 115 μm (110 μm≤pitch≤115 μm) or between 112 μm and 114 μm (112 μm≤pitch≤114 μm), but it is not limited thereto. In the present disclosure, the "pitch between the first protruding portion P21 and the second protruding portion P22" refers to, between the adjacent first protruding portion P21 and second protruding portion P22, the distance between an end point E1 of the first protruding portion P21 farthest away from the light output surface 211 and an end point E2 of the second protruding portion P22 farthest from the light out surface 211. In other words, the pitch between the first protruding portion P21 and the second protruding portion P22 may be substantially defined by the length of the flat portion P1 therebetween. Similarly, the "pitch between the second protruding portion P22 and the third protruding portion P23" refers to, between the adjacent second protruding portion P22 and third protruding portion P23, the distance between an end point E2 of the second protruding portion P22 farthest away from the light output surface 211 and an end point E3 of the third protruding portion P23 farthest away from the light output surface 211. In other words, the pitch between the second protruding portion P22 and the third protruding portion P23 may be substantially defined by the length of the flat portion P1 therebetween.

Figure 5A:
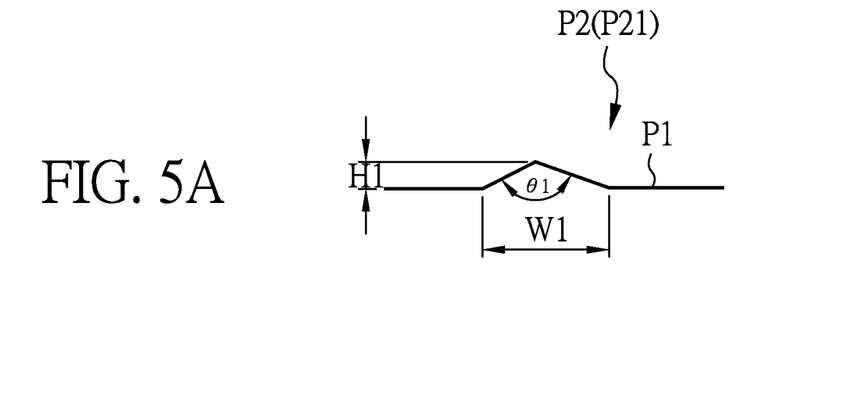
FIGS. 5A to 5C are schematic diagrams of the protruding portions according to an embodiment of the present disclosure.
Figure 5B:
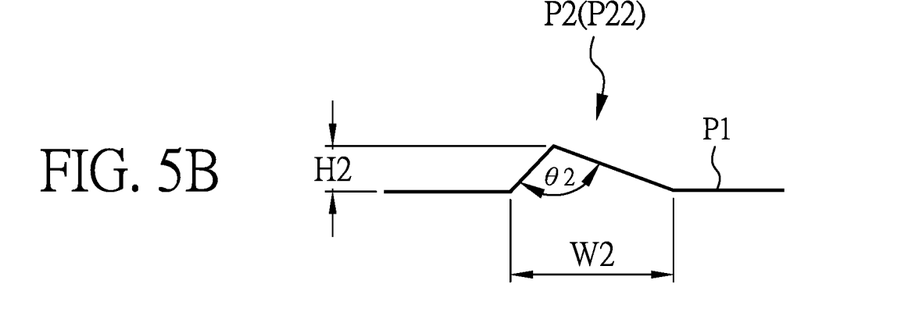
Figure 5C:
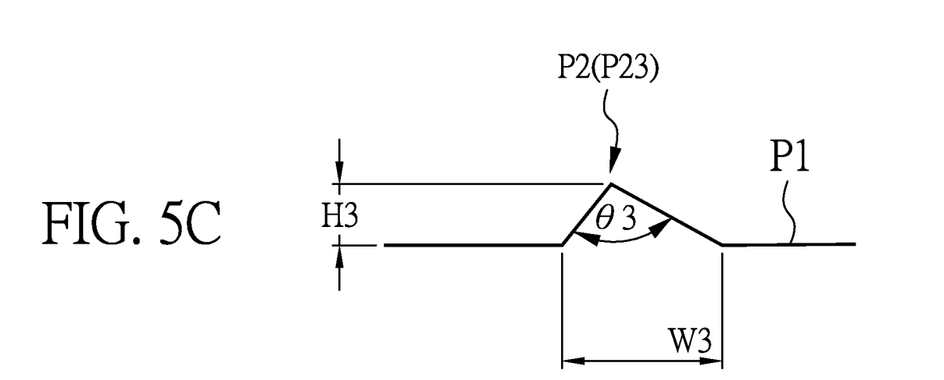

FIGS. 5A to 5C are schematic diagrams of the protruding portions P2 according to an embodiment of the present disclosure, wherein FIG. 5A is a schematic diagram of the first protruding portion P21, FIG. 5B is a schematic diagram of the second protruding portion P22, and FIG. 5C is a schematic diagram of the third protruding portion P23.

As shown in FIG. 2 and FIG. 5A to FIG. 5C, in some embodiments, the widths of the protruding portions P2 may increase toward a direction along which the protruding portions P2 are disposed, for example, away from the corresponding light emitting element 1, but it is not limited thereto. In some embodiments, the heights of the protruding portions P2 may increase toward a direction along which the protruding portions P2 are disposed, for example, away from the corresponding light emitting element 1, but it is not limited thereto. In some embodiments, the vertex angles of the protruding portions P2 may decrease toward a direction along which the protruding portions P2 are disposed, for example, away from the corresponding light emitting element 1, but it is not limited thereto. When the dimensions (e.g., widths, heights and/or angles) of the protruding portions P2 satisfy the aforementioned relationship, the light output efficiency of the backlight module can be improved, so as to improve the defect of excessive energy consumption.

For example, in some embodiments, as shown in FIG. 5A, the first protruding portion P21 may have a first width W1, a first height H1 and a first vertex angle θ1, wherein the first width W1 may be between 16 μm and 17.5 μm (16 μm≤W1≤17.5 μm), the first height H1 may be between 3 μm and 4 μm (3 μm≤H1≤4 μm), and the first vertex angle θ1 may be between 130° and 135° (130°≤θ1≤135°), but it is not limited thereto.

As shown in FIG. 5B, the second protruding portion P22 has a second width W2, a second height H2 and a second vertex angle θ2, wherein the second width W2 may be between 24.5 μm and 26 μm (24.5 μm≤W2≤26 μm), the second height H2 may be between 6 μm and 8 μm (6 μm≤W2≤8 μm), and the second vertex angle θ2 may be between 110° and 115° (110°≤θ2≤115°), but it is not limited thereto.

As shown in FIG. 5C, the third protruding portion P23 has a third width W3, a third height H3 and a third vertex angle θ3, wherein the third width W3 may be between 38 μm and 42 μm (38 μm≤W3≤42 μm), the third height H3 may be between 10 μm and 12.5 μm (10 μm≤H3≤12.5 μm), and the third vertex angle θ3 may be between 100° and 105° (100°≤θ3≤105°), but it is not limited thereto. The range for the widths, heights and vertex angles of the aforementioned protruding portions are for illustrative purpose only, and may be adjusted according to the actual requirements.

In the present disclosure, the "width of the protruding portion" refers to the maximum width of the protruding portion P2 in the cross-sectional view, and the "height of the protruding portion" refers to the maximum height of the protruding portion P2 to the flat portion P1 in the cross-sectional view.

Figure 6:
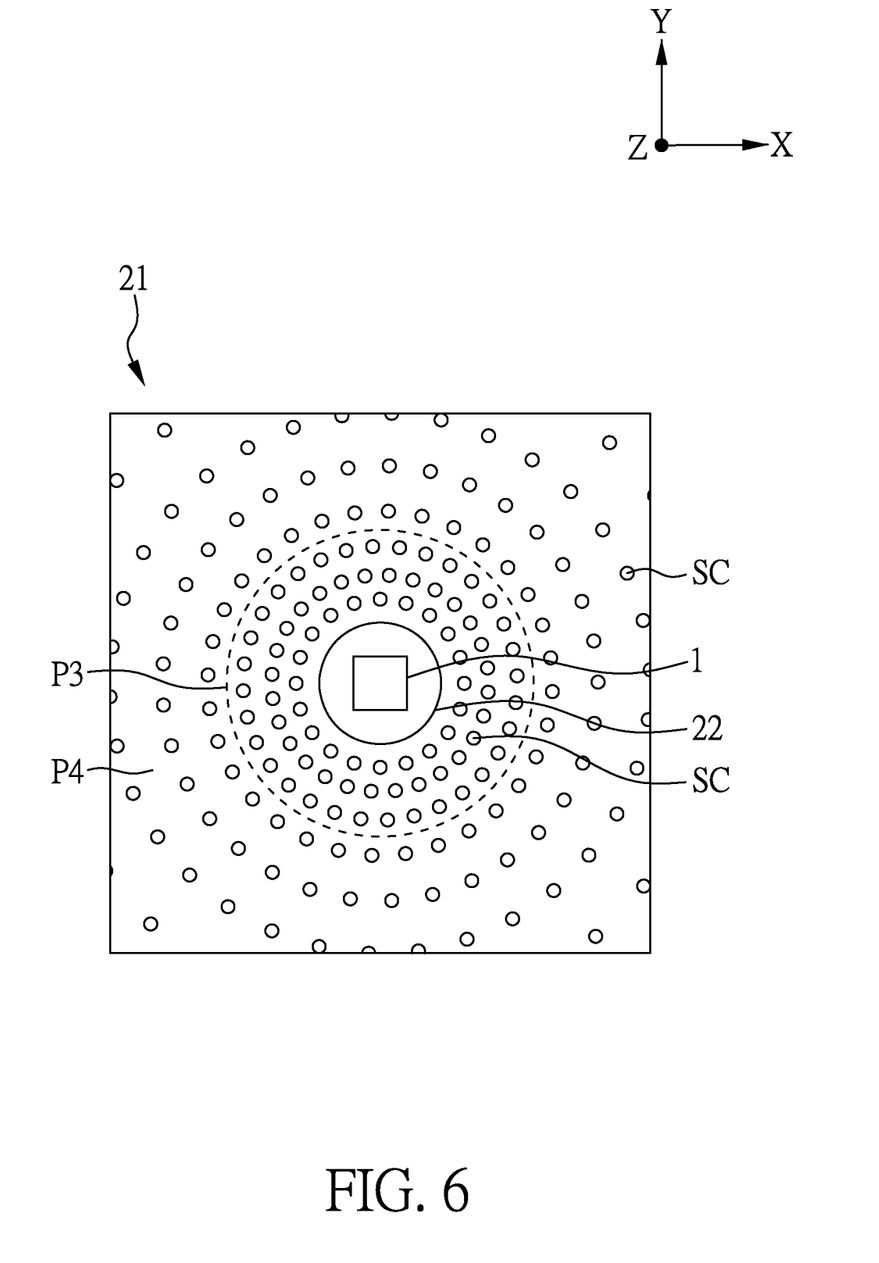
FIG. 6 is a schematic diagram of the scattering units according to an embodiment of the present disclosure.

FIG. 6 is a schematic diagram of the scattering units in the bottom view direction of the light guide device according to an embodiment of the present disclosure.

As shown in FIG. 2 and FIG. 3, the bottom surfaces 212 of the plurality of light guide portions 21 have a plurality of scattering units SC, and the plurality of scattering units SC protrude, for example, in a direction away from the light output surfaces 211. The height H of the scattering unit SC may be between 16 μm and 20 μm (16 μm≤H≤20 μm) or between 16.5 μm and 19.5 μm (16.5 μm≤H≤19.5 μm), but it is not limited thereto. The "height H of the scattering unit SC" refers to the maximum height of the scattering unit SC to the bottom surface 212.

In the present disclosure, the scattering units SC may be arranged on the bottom surfaces 212 of the plurality of light guide portions 21 by a suitable method (e.g., injection molding, halftone printing, glue dispensing, etc., but not limited thereto). The material of the scattering unit SC may include transparent material, for example, may include epoxy resin, silicone, acrylic, polymethyl methacrylate or a combination thereof, but it is not limited thereto. In some embodiments, the scattering units SC may, for example, be integrally formed with the light guide portion 21 or formed separately. In the bottom view direction of the light guide device 2, as shown in FIG. 6, the scattering unit SC may have a circular arc shape. For example, the diameter of the scattering unit SC may be between 27 μm and 37 μm, and the curvature radius of the scattering unit SC may be between 12 μm and 14.5 μm (12 μm≤curvature radius≤14.5 μm) or between 13 μm and 13.5 μm (3 μm≤curvature radius≤13.5 μm), but it is not limited thereto.

As shown in FIG. 6, the bottom surface 212 has a first portion P3 and a second portion P4, and the first portion P3 is adjacent to the corresponding light emitting element 1 compared to the second portion P4. More specifically, the first portion P3 is disposed between the second portion P4 and the corresponding light emitting element 1. The density of the plurality of scattering units SC in the first portion P3 may be greater than the density of the plurality of scattering units SC in the second portion P4, but it is not limited thereto, so that the light output efficiency of the backlight module can be improved. The density of the plurality of scattering units SC in the first portion P3 may be, for example, the area occupied by the scattering units SC contained in a unit area of the first portion P3 divided by the unit area. Similarly, the density of the plurality of scattering units SC in the second portion P4 may be, for example, the area occupied by the scattering units SC contained in the same unit area of the second portion P4 divided by the unit area.

Figure 7A:
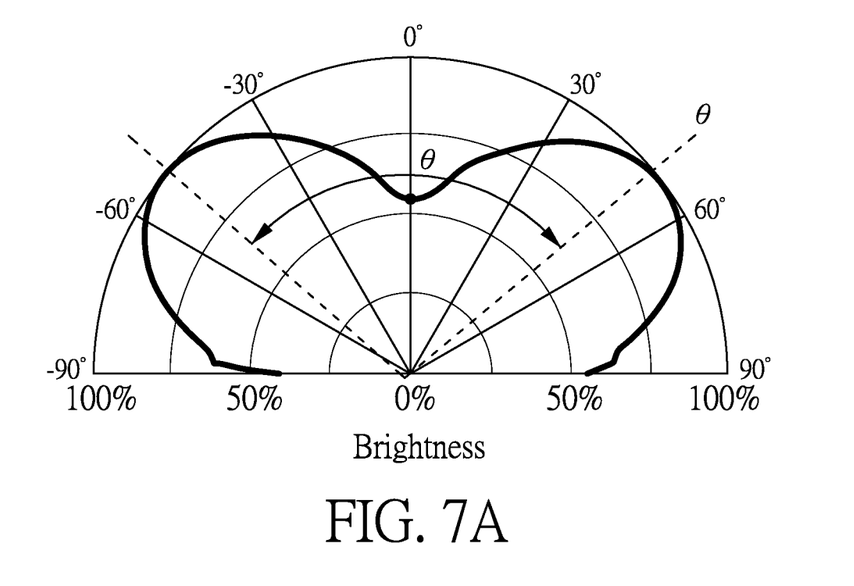
FIG. 7A is a diagram showing the relationship between the angle and the brightness of the backlight module according to an embodiment of the present disclosure.
Figure 7B:
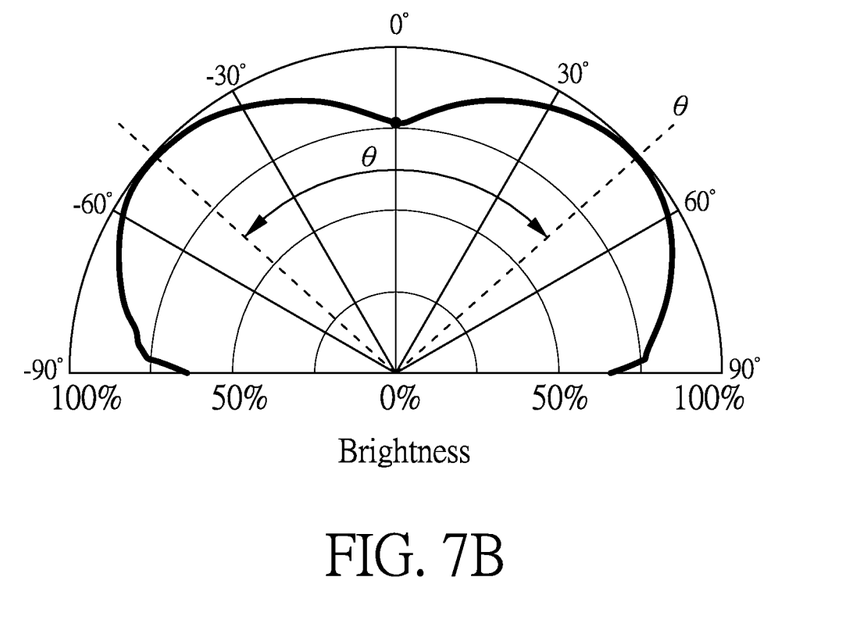
FIG. 7B is a diagram showing the relationship between the angle and the brightness of the backlight module according to another embodiment of the present disclosure.

FIG. 7A is a diagram showing the relationship between the angle and the brightness of the backlight module according to an embodiment of the present disclosure, and FIG. 7B is a diagram showing the relationship between the angle and the brightness of the backlight module according to another embodiment of the present disclosure, wherein the backlight module used in FIG. 7A is similar to that in FIG. 7B, except that the first reflective element is different.

In the backlight module of FIG. 7A, the first reflective element 31 (as shown in FIG. 2 or FIG. 3) may include, for example, 40% by weight of titanium dioxide, but it is not limited thereto. In the backlight module of FIG. 7B, the first reflective element 31 (as shown in FIG. 2 or FIG. 3) may include, for example, 20% by weight of titanium dioxide, but it is not limited thereto. The two backlight modules are respectively subject to the brightness versus angle test, and the results are shown in FIG. 7A and FIG. 7B. From the results, it is found that the viewing angles of the two backlight modules are between −90° and 90° at half brightness (50% brightness). When the brightness is 100%, the viewing angle of the backlight module of FIG. 7A is between −50° and 50°, and the viewing angle of the backlight module of FIG. 7B is between −45° and 45°. Therefore, both the two backlight modules may obtain a relatively uniform collimated light source, so as to improve the light output efficiency of the backlight module or eliminate the halo phenomenon.

Figure 8:
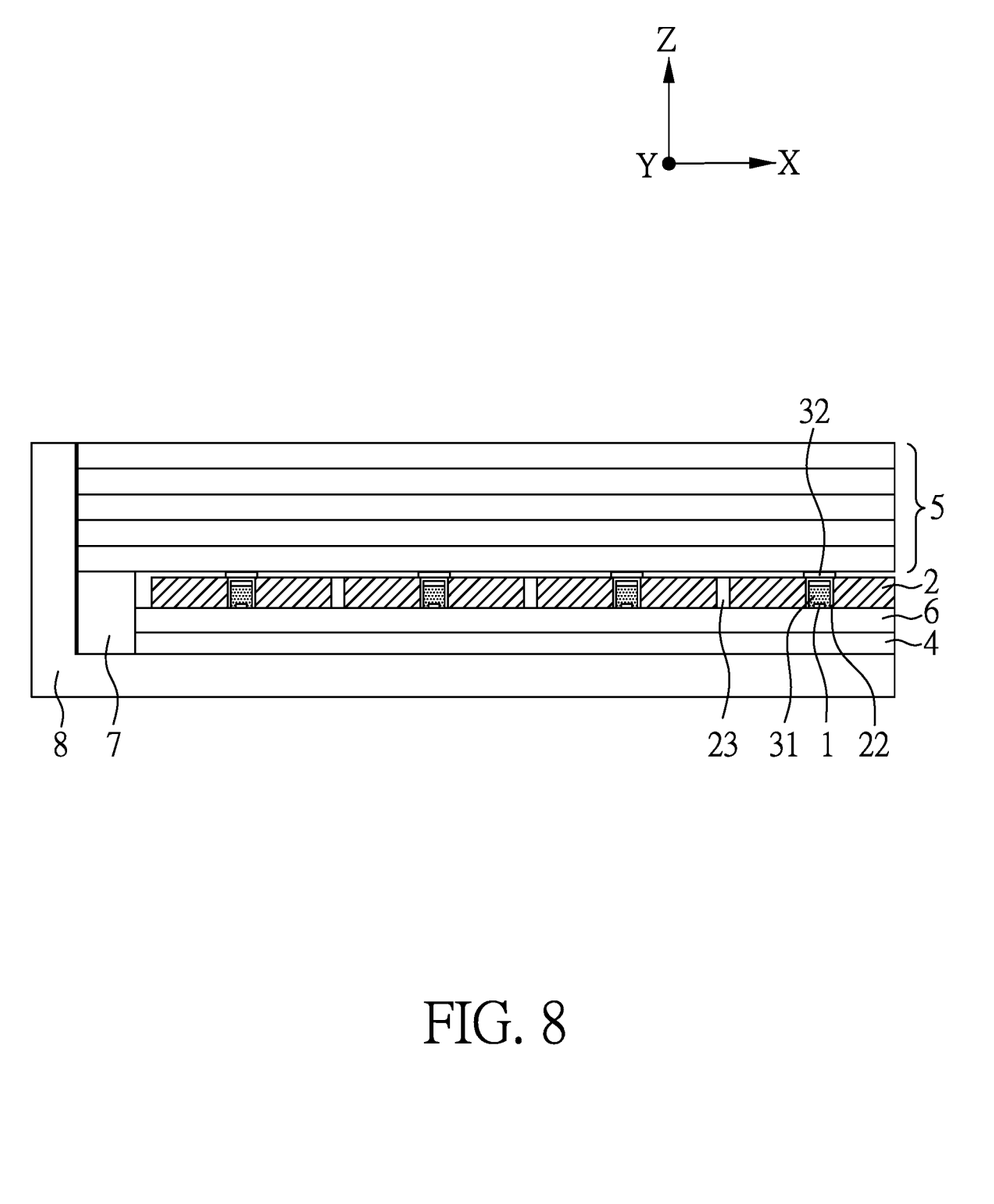
FIG. 8 is a schematic diagram of the backlight module according to an embodiment of the present disclosure.

FIG. 8 is a schematic diagram of the backlight module according to an embodiment of the disclosure.

As shown in FIG. 8, the backlight module of the present disclosure may include a substrate 4, a plurality of light emitting elements 1 and a light guide device 2 arranged on a substrate 4, and the plurality of light emitting elements 1 are electrically connected to the substrate 4. In this embodiment, the substrate 4 may be a circuit board, such as a printed circuit board (PCB), a flexible printed circuit board (FPC), or other suitable circuit boards.

In this embodiment, as shown in FIG. 8, the backlight module may further include an optical film sheet 5, which is arranged on the light emitting element 1 and the light guide device 2. The optical film sheet 5 may be a brightness enhancement film, a diffuser sheet, or a combination thereof, but it is not limited thereto. In addition, the optical film sheet 5 may include a plurality of optical films, or a plurality of optical films may be integrated into an optical film sheet set.

In this embodiment, the backlight module may further include a reflective layer 6 arranged on the substrate 4, wherein the plurality of light emitting elements 1 and the light guide device 2 may be arranged on the reflective layer 6. The reflective layer 6 may guide the light of the light emitting elements 1 into the light guide device 2 again, so as to improve the light output efficiency of the backlight module. It is noted that the reflective layer 6 may include, for example, a plurality of openings (not shown), so that a plurality of conductive pads (not shown) on the substrate 4 may be exposed by the openings, and the conductive electrodes (not shown) of the light emitting elements 1 may be connected to the plurality of conductive pads of the substrate 4 through, for example, the openings. In some embodiments, the material of the reflective layer 6 may include metal (e.g., silver, aluminum), plastic material (e.g., polyimide, polyethylene terephthalate), etc., but it is not limited thereto.

As shown in FIG. 8, the backlight module may further include a plastic frame 7 and/or an iron member 8, wherein the substrate 4 may be, for example, arranged in the iron member 8 and the plastic frame 7 may be used to support the substrate 4, but it is not limited thereto. Although not shown in the figures, in some embodiments, an adhesive layer may be selectively included between the substrate 4 and the iron member 8 and/or between the plastic frame 7 and the iron member 8 for fixing the substrate 4 and the iron member 8 and/or the plastic frame 7 and the iron member 8, but it is not limited thereto. In other embodiments, the substrate 4 and the iron member 8 and/or the plastic frame 7 and the iron member 8 may be fixed by other methods.

The aforementioned specific embodiments should be construed as merely illustrative, and not limiting the rest of the present disclosure in any way.

What is claimed is:

1. A backlight module, comprising:
   a substrate;
   a plurality of light emitting elements arranged on the substrate;
   a light guide device comprising a plurality of light guide portions arranged to respectively correspond to the light emitting elements, wherein each of the light guide portions is provided with a first through hole, and the first through holes of the light guide portions respectively expose the light emitting elements; and
   a plurality of reflective elements respectively arranged on the light emitting elements, wherein, in a normal direction of the substrate, the reflective elements respectively overlap with the first through holes of the light guide portions,
   wherein the light guide device comprises a connecting portion, and two adjacent light guide portions of the plurality of light guide portions are connected through the connecting portion.

2. The backlight module as claimed in claim 1, wherein the reflective elements comprise a plurality of first reflective elements, and the first reflective elements are disposed in the first through holes of the light guide portions, respectively.

3. The backlight module as claimed in claim 1, wherein the reflective elements comprise a plurality of second reflective elements, and the second reflective elements are respectively arranged on the light guide portions.

4. The backlight module as claimed in claim 1, wherein each of the light guide portions has a light output surface and a bottom surface arranged to be opposite to the light output surface, and the light emitting elements are respectively adjacent to the bottom surfaces and away from the light output surfaces, in which the light output surface comprises a plurality of flat portions and a plurality of protruding portions, and the flat portions and the protruding portions are alternately arranged and connected to each other.

5. The backlight module as claimed in claim 4, wherein the protruding portions of the light output surface of the light guide portion surround the light emitting element corresponding thereto among the plurality of light emitting elements.

6. The backlight module as claimed in claim 1, wherein each of the light guide portions has a light output surface and a bottom surface arranged to be opposite to the light output surface, and the light output surfaces of the light guide portions are respectively far away from the light emitting elements corresponding thereto, and the bottom surface has a plurality of scattering units.

7. The backlight module as claimed in claim 6, wherein the bottom surface has a first portion and a second portion, and the first portion is adjacent to the light emitting element corresponding thereto compared to the second portion, in which, a density of the scattering units in the first portion is greater than a density of the scattering units in the second portion.

8. The backlight module as claimed in claim 1, wherein the light guide device is provided with a second through hole, and the second through hole is disposed between the two adjacent light guide portions of the plurality of light guide portions.

9. The backlight module as claimed in claim 1, further comprising a reflective layer arranged on the substrate, wherein the light emitting elements and the light guide device are arranged on the reflective layer.

10. The backlight module as claimed in claim 2, wherein, in the normal direction of the substrate, an area of the first reflective element is smaller than an area of the first through hole.

11. The backlight module as claimed in claim 3, wherein, in the normal direction of the substrate, an area of the second reflective element is larger than an area of the first through hole.

12. The backlight module as claimed in claim 1, wherein the light emitting element comprises a chip and an encapsulation layer arranged on the chip to encapsulate the chip.

13. The backlight module as claimed in claim 5, wherein pitches between two adjacent protruding portions of the plurality of protruding portions are equal.

14. The backlight module as claimed in claim 5, wherein widths of the protruding portions increase toward a direction along which the protruding portions are disposed away from the light emitting element corresponding thereto.

15. The backlight module as claimed in claim 5, wherein heights of the protruding portions increase toward a direction along which the protruding portions are disposed away from the light emitting element corresponding thereto.

16. The backlight module as claimed in claim 5, wherein vertex angles of the protruding portions decrease toward a direction along which the protruding portions are disposed away from the light emitting element corresponding thereto.

17. The backlight module as claimed in claim 6, wherein the scattering units protrude in a direction away from the light output surface.

18. The backlight module as claimed in claim 17, wherein the scattering unit has a circular arc shape.

19. The backlight module as claimed in claim 1, further comprising an optical film sheet arranged on the light emitting elements and the light guide device.

* * * * *